United States Patent [19]

Dolin

[11] Patent Number: 4,971,495
[45] Date of Patent: Nov. 20, 1990

[54] LUG NUT RETAINER

[76] Inventor: Lee A. Dolin, P.O. Box 320, Rte. 616, Calverton, Va. 22016

[21] Appl. No.: 356,222

[22] Filed: May 24, 1989

[51] Int. Cl.$^5$ ............................................. F16B 39/02
[52] U.S. Cl. ................................... 411/102; 411/352; 411/530; 301/9 DN
[58] Field of Search ..................... 411/92, 87, 88, 100, 411/123, 353, 375, 376, 429, 430, 352, 517, 521, 522, 523, 528, 530; 301/9 DN, 530, 960

[56] References Cited

U.S. PATENT DOCUMENTS

| Re. 21,517 | 7/1940 | Dalley ................................. 411/960 |
| 497,963 | 5/1893 | Johnson . |
| 581,215 | 4/1897 | Lombas . |
| 791,590 | 6/1905 | Stull ................................... 411/544 |
| 813,031 | 2/1906 | Allen . |
| 957,746 | 5/1910 | Clawson . |
| 1,156,798 | 10/1915 | Meaker .............................. 411/960 |
| 1,544,627 | 7/1925 | Bateman . |
| 1,725,790 | 8/1929 | Halagarda . |
| 1,815,095 | 7/1931 | Brandt . |
| 1,997,821 | 4/1935 | Gzupkaytie ........................ 411/530 |
| 2,280,584 | 4/1942 | Horn . |
| 2,626,837 | 1/1953 | Wilson et al. . |
| 2,758,628 | 8/1956 | Rice . |
| 3,602,284 | 8/1971 | Smith ................................. 411/352 |
| 3,620,574 | 11/1971 | Cox . |
| 3,829,163 | 8/1974 | Hans . |
| 4,657,457 | 4/1987 | Rickwood . |
| 4,737,057 | 4/1988 | Olsson . |
| 4,759,672 | 7/1988 | Nilsen ................................ 411/375 |

OTHER PUBLICATIONS

Advertisement in the National Parts Peddler, p. 67, vol. 14, No. 4, May 1989.
Advertisement in the National Parts Peddler, p. 67, Feb. 1989.

Primary Examiner—Gary L. Smith
Assistant Examiner—Jerry Redman
Attorney, Agent, or Firm—Dickstein Shapiro Morin

[57] ABSTRACT

A lug nut retainer that holds a lug nut in position proximate to a wheel lug hole to accept a stud extended through the wheel lug hole and for resiliently urges the lug nut onto the stud while allowing the lug nut to rotate to screw onto and off of the stud. A resilient retaining clip is mounted onto the wheel to hold the lug nut in position near the wheel lug hole and to resiliently urge the lug nut towards the wheel lug hole. The retaining clip is fastened to the wheel lug hole by inserting an arm of the clip through two holes provided in the wheel. As an additional feature, a limit clip is provided that limits the motion of the retaining clip to decrease the likelihood that the retaining clip may be bent or damaged while allowing the retaining clip to be positioned on a nut. The lug nut is provided with a socket stop ring around which the retaining clip is positioned. The stop ring keeps the socket from rubbing against the retaining clip. For wheel types where the retaining clips protruding through the back of the wheel would contact the hub or otherwise interfere with other parts of the automobile, a retaining plate is attached to the wheel for holding the retaining and limit clips.

25 Claims, 4 Drawing Sheets

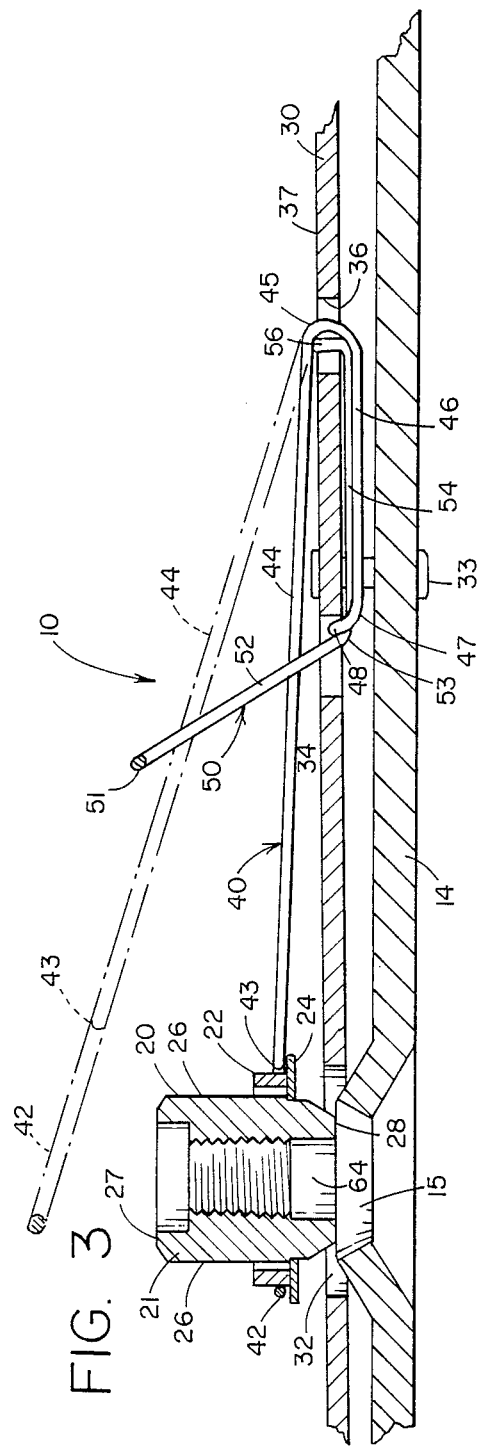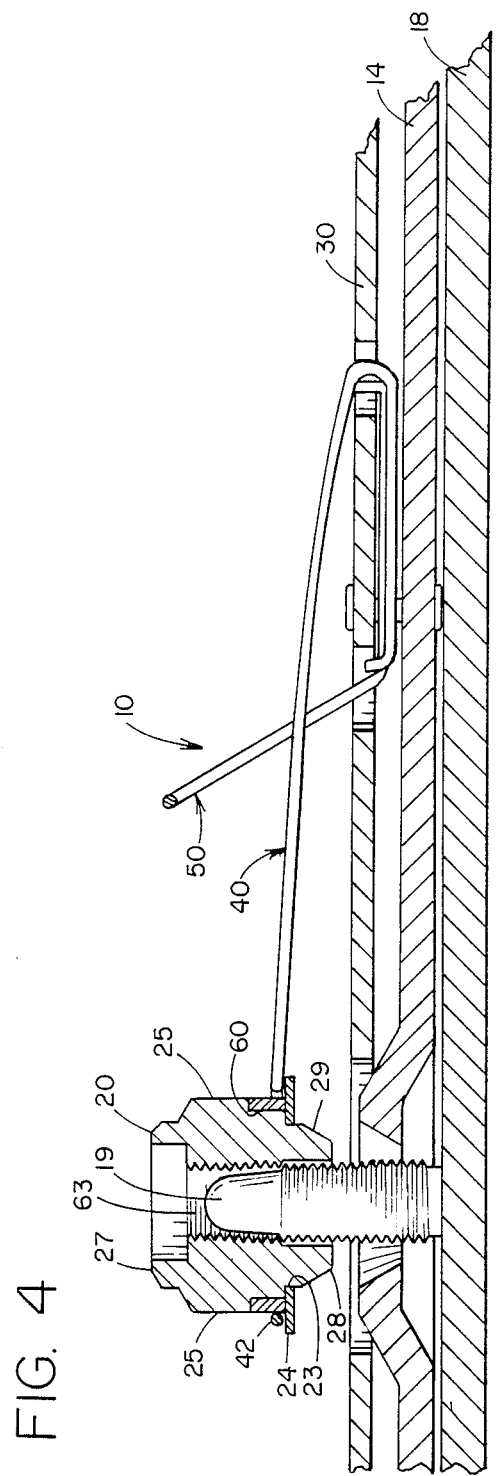

LUG NUT RETAINER

BACKGROUND OF THE INVENTION

The present invention relates generally to a nut retainer and more particularly to a lug nut retainer for holding lug nuts in position for loosening and tightening of the lug nuts in automobile racing.

In automobile racing, it is crucially important to minimize the length of time required for pit stops for refueling, tire changing and other necessary service to the race car. For tire changing during pit stops, it has long been the typical practice to prepare fresh tires for mounting during the pit stop by prepositioning the lug nuts at the tire wheel lug holes and securing the nuts to the wheel in that position with adhesive. Then, during the pit stop the used wheels are removed from the race car and the prepared wheels are positioned onto the car's wheel hubs so that the hub studs protrude through the wheel lug holes and into the lug nuts. The studs break the adhesive bond holding the lug nuts to the wheels and the lug nuts are left on the ends of the studs in position for tightening.

This known method for positioning the lug nuts presents a number of disadvantages. When the adhesive does not properly hold the nut to the shell or the lug nut does not properly engage the stud during the positioning of the wheel, the lug nut may drop off of the stud onto the ground. Similarly, if the lug nut or the stud are moved before the nut is tightened the nut may drop off of the stud. The additional time required to retrieve the lug nut and position it on the stud for tightening may significantly increase the duration of the pit stop. When the used wheels are removed from their hubs the used lug nuts are commonly allowed to fall to the ground to be retrieved during or after the pit stop. If a lug nut is run over by a car, the lug nut may damage the car's tire and may be picked up by the car's tire and thrown, resulting in damage to the car or injury to a pitman or spectator. Moreover, the pitmen may have to move into the path of other cars in order to retrieve the used lug nuts. In addition, if the lug nut does not properly engage the stud, the threads of the nut and/ or stud may be damaged. Finally, cleaning the nut adhesive from the wheels, nuts and studs is time consuming. Accordingly, there is a need in the art for an improved lug nut retainer.

SUMMARY OF THE INVENTION

The present invention alleviates to a great extent the disadvantages of the prior art by providing a lug nut retainer that holds the lug nut in position at the wheel lug hole to accept the stud extended through the wheel lug hole and for resiliently urging the lug nut onto the stud and simultaneously allowing the lug nut to rotate to screw onto and off of the stud.

In one aspect of the present invention a resilient retaining clip is mounted onto the wheel to hold the lug nut in position near the wheel lug hole and to resiliently urge the lug nut towards the wheel lug hole.

In another aspect of the invention the retaining clip is fastened to the wheel lug hole by inserting an arm of the clip through two holes provided in the wheel. As an additional feature, a limit clip is provided that limits the motion of the retaining clip to decrease the likelihood that the retaining clip may be bent or damaged while allowing the retaining clip to be positioned on a nut.

In another aspect of the present invention the retaining nut is provided with a socket stop sleeve, around which the retaining clip is positioned, for keeping the nut drive socket from rubbing significantly against the retaining clip.

In another aspect of the invention, a retaining plate is provided for holding the retaining clip and the retaining plate is fixed to the wheel for wheel types where the retaining and limit clips protruding through the back of the wheel would contact the hub or otherwise interfere with parts of the automobile.

It is an object of the present invention to provide a nut retainer for holding a nut in position proximate a lug nut hole.

It is another object of the present invention to provide a nut retainer with foregoing advantages and which may be resiliently moved in relation to the stud.

It is a further object of the invention to provide a lug nut retainer with the foregoing advantages and which is light weight and may be used on automobile racing wheels.

Other objects and advantages of the present invention will become readily apparent from the following description and drawings which illustrate preferred embodiments of the present invention.

BRIEF DESCRIPTION OF THE DRAWINGS

FIG. 3 is a section view taken along the line III—III of FIG. 2.

FIG. 4 is a view like FIG. 3 with the lug nut slightly rotated and in an untightened position on a stud.

DETAILED DESCRIPTION OF PREFERRED EMBODIMENTS

Figure 1:
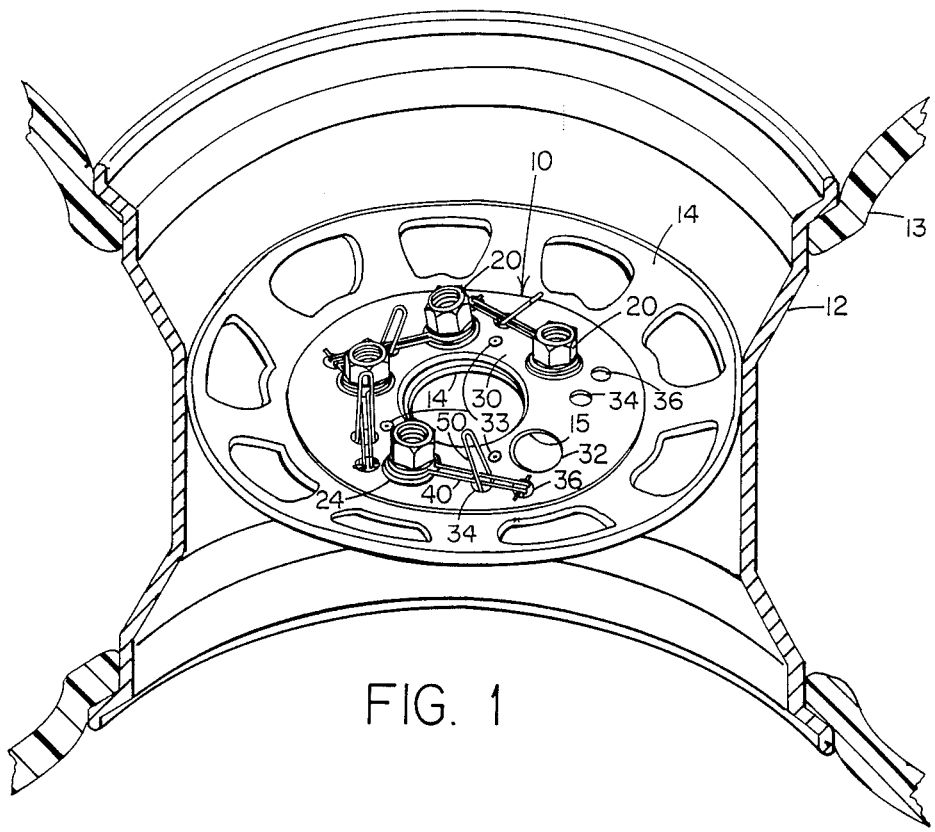
FIG. 1 is a perspective view of a tire wheel including a lug nut retainer according to a preferred embodiment of the present invention.

Refer now to FIG. 1 there being shown a perspective view of a tire wheel including a lug nut retainer, generally designated by reference numeral 10, according to a preferred embodiment of the present invention. A tire 13 is mounted on a wheel 12 which includes a hub plate 14. A retaining plate 30 is attached to the hub plate 14 by three fasteners 33. The fasteners 33 may be rivets or other suitable means for fastening. For each lug nut on the wheel, the retaining plate 30 has a corresponding set of holes formed through its thickness. One lug nut 20 and its corresponding clips 40 and 50 of retainer 10 are not shown in FIG. 1 so that the relative positioning of one set of these holes may be viewed with clarity. Each set of holes includes a lug hole 32, a first clip hole 34 and a second clip hole 36. The lug holes 32 are provided for accepting the hub studs as described in more detail below, particularly with respect to FIG. 4. The wheel hub plate 14 has corresponding lug holes 15 for accepting the hub studs. The first clip holes 34 and the second clip holes 36 are positioned for holding the clips 40 and 50 as described in more detail below, particularly with respect to FIGS. 2 through 4. Each lug nut 20 has a flange 24 which is engaged by the resilient retaining clip 40 to hold the lug nut 20 proximate to the lug hole 32 and to resiliently urge the lug nut 20 towards the hub plate 14.

Figure 2:
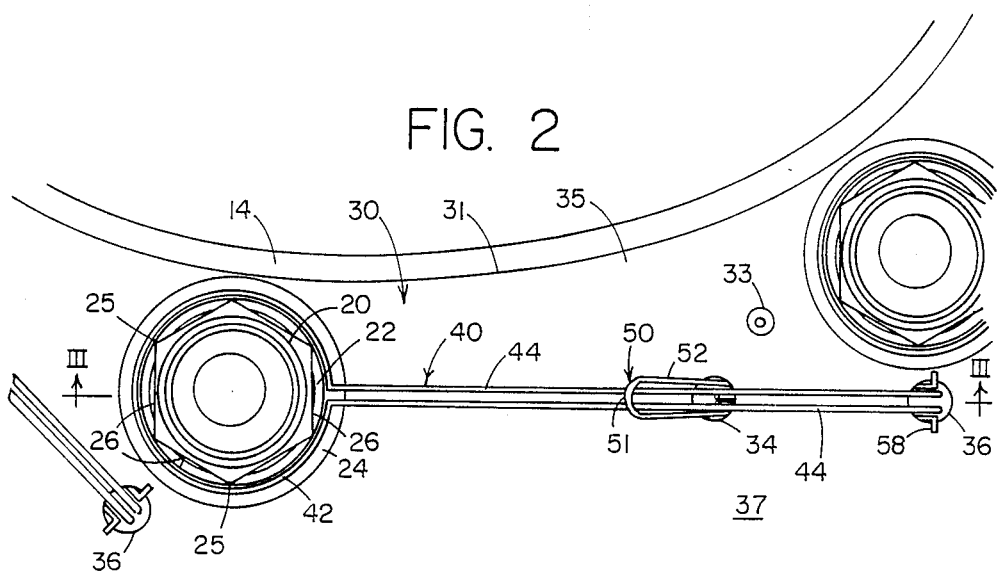
FIG. 2 is a plan view of a single lug nut held by the lug nut retainer of FIG. 1.

Refer now to FIG. 2 which shows an enlarged plan view of one of the lug nuts 20 and its corresponding clips 40 and 50 of FIG. 1. The retaining clip 40 includes a ring 42 that is sized large enough to extend around the outside of the nut 20 to allow the nut to rotate, and small enough to prevent the flange 24 from passing through the ring 42. Thus, the ring 42 engages the nut 20 by interference with the flange 24 to hold the nut 20 in position at its corresponding lug hole 32 while allowing the nut 20 to rotate to be screwed on and off the stud. The retaining ring 42 has two arms 44 which extend from the ring 42 to the second clip hole 36 and, as described in further detail with respect to FIGS. 3 and 4, extends under the retaining plate 30 and back towards the first clip hole 34. The limit clip 50 an arch 51 and has two arms 52 extending from the arch 51 past the outsides of the retainer clip arms 44 and into the first clip hole 34. The limit clip 50 then further extends under the retainer plate 30 and up through the second clip hole 36 to engage the upper surface of the retaining plate 30 with a pair of feet 58.

Refer now to FIGS. 3 and 4, there being shown cross-sectional views of the nut retainer 10. The plane of FIG. 3, the cross section taken through nut 20, is perpendicular to two of the nut faces 26. FIG. 4 shows the nut rotated by fifteen degrees so that the plane of FIG. 4 extends through the edges 25 between the nut faces 26. The nut 20 includes a body 21 having a socket end 27 and a hub end 28. The nut 20 has six faces 26 and six edges 25 formed where adjacent faces 26 meet. Six sleeve recesses 60 are formed in the body 21 of the hub end of the edges 25. A socket stop sleeve 22 is positioned around the body 21 at the recesses 25. The body 21 near the edges 25 engages and holds the socket stop sleeve 22 from movement towards the socket end 27 of the nut 20. A flange recess 23 is formed at the hub end 27 of the nut 20 adjacent to the sleeve recesses 60. The flange 24 is positioned around the nut 20 at the flange recess 23. The flange 24 is a flattened donut shape like a washer and has an inner diameter 61 and an outer diameter 62. The inner diameter 61 is sized for the flange 24 to be pressed fit onto the lug nut 20. Alternatively, the flange 24 may be held onto the lug nut 20 by other means. The outer diameter 62 of the flange 24 is sized so that the flange 24 will engage both the socket stop sleeve 22 and the ring 42 of the retaining clip 40. The retaining clip ring 42 extends around the outside of the sleeve 22.

The sleeve 22 has an outside diameter which is larger than the distance between the opposing nut faces 26 so that when the drive socket (not shown) is positioned onto the nut 26 for tightening or loosening the nut, the drive socket abuts against the socket end of socket stop sleeve 22 and is kept from bearing significantly against the retaining clip ring 42.

The retaining clip 40 has a pair of arms 44 which extend from the ring bends 43 to the arm bends 45. The arm bends 45 extend through the second clip hole 36 of the retaining plate 30. The legs 46 extend from the arm bend 45 underneath the retaining plate 30 and back towards the first clip hole 34. The retaining clip 40 then has two ankle bends 47 connecting the respective legs 46 to the feet 48. The feet 48 extend at least partially into the first clip hole 34 to limit the rotation of the retaining clip 40 in the second clip hole 36 and to align the retaining ring 42 with the lug hole 32.

The lengths of the arms 44 and the legs 46 are chosen to allow for some limited translational movement of the retaining clip 40 in the first clip hole 34 and the second clip hole 36 and to allow for manufacturing dimensional errors in the retaining plate 30 as well as in the hub plate lug hole 15 of lug plate 14. The limit clip 50 has an arch 51 from which extends two arms 52. The arms 52 extend through the first clip hole 34 and are connected at the arm bends 53 to two first legs 54. The first legs 54 are connected at the knee bends 55 to the second legs 56. The first legs 54 extend beneath the retaining plate 30 towards the second clip hole 36. The second legs 56 extend up through the second clip hole 36. As shown in FIG. 2, the feet 58 connect to the second leg portions 56 and extend outward to engage the top of the retainer plate 30. The length of the first leg portions 54 is chosen to allow some lateral movement of the limit clip 50 with respect to the clip holes 34 and 36. The length of the arms 52 are chosen to allow movement of the arms 44 of the retaining clip 40, extending between the arms 52, a sufficient distance so that the lug nuts 20 can be inserted or removed from position within the retaining ring 42 and at the lug hole 32. The arch 51 and the arms 52 limit the upward and sideways movement of the arms 44 to maintain alignment of the ring 42 and to inhibit plastic bending of the clip 40.

Arms 52 are connected at the arm bends 53 at an angle 70 to the first legs 54 to provide for easier assembly and also to engage the arms 44 at a position which is less likely to result in the bending of the arms 44 during use. In addition, if sufficient upward force is exerted on the arms 44 so that they engage the arch 51, some resilient bending of the arms 52, and thus movement of the arch 51, will result to further decrease the likelihood of plastically bending the arms 44. In FIG. 3, the retaining clip 40 is shown in phantom in a raised position to allow the positioning of the nut 25.

Refer now to FIG. 4 wherein the hub plate 14 is shown in position on a hub 18 with a threaded stud 19 extending through the hub plate stud hole 15, through the lug hole 32 and extends into the threaded bore 63 of the nut 20. Note that the lug hole 32 of the retaining plate 30 accepts the raised hub plate lug hole 15 and further that the lug hole 32 is sized sufficiently large so that the retaining plate 30 does not bear significantly against the flange 24 upon tightening of the lug nut 20. The bearing surfaces are at lug plate lug hole 15 and the nut bearing surface 29. Similarly, the flange 24 is positioned so that it is not tightened against the hub plate 14 when the lug nut 20 is tightened. Rather, conical nut bearing surface 29 bears against the conical hole 15 upon tightening of the lug nut 20. The undercut portion 64 of the bore 63 is unthreaded and cut larger in diameter to reduce the weight of the nut 20, to help axially align the nut 20 before tightening and to enhance the release of the threads of the nut 20 from the stud 19 upon untightening and removal of the nut 20. Also shown in FIG. 3, the fastener 33 extends to hold the retaining plate 30 to the hub plate 14.

Figure 5:
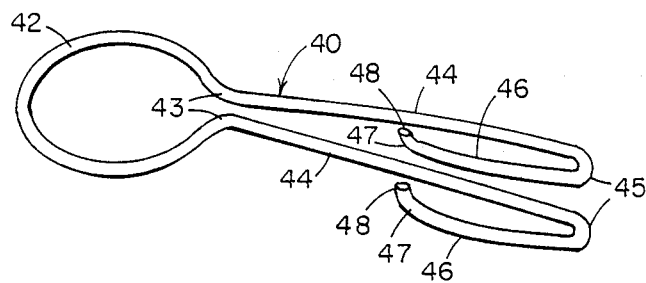
FIG. 5 is a perspective view of the retaining clip of the lug nut retainer of FIG. 1.
Figure 6:
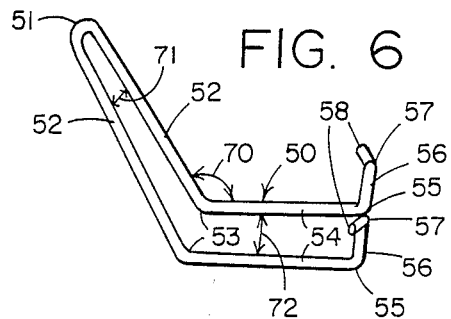
FIG. 6 is a perspective view of the limit clip of the lug nut retainer of FIG. 1.

Refer now to FIGS. 5 and 6 which show perspective views of the retaining clip 40 and the limit clip 50. The retaining clip 40 has a ring 42 and a pair of arms 44 which extend from the ring bends 43 to the arm bends 45. The legs 46 extend from the arm bends 45 to the leg bends 47 which connect the legs 46 to the feet 48. Arms 44 may be curved slightly over their length to be concave towards the feet 48 to decrease the likelihood of plastically bending the arms 44 during use. The limit clip 50 has an arch 51 from which extend two arms 52 diverging, with the clip 50 in the relaxed position, at an angle 71. The arms 52 are connected at the bends 53 to the first legs 54 at an angle 70. The first legs 54 diverge, with the clip 50 in the relaxed state, at an angle 72. The first legs 54 are connected at knee bends 55 to the second legs 56. The second legs 56 are connected at ankle bends 57 to the feet 58 which extend outwardly. The clip 50 is formed so that the arms 52 and the legs 54 diverge so that when the clip 50 is in position and extending through the clip holes 34 and 36, the clip 50 is under slight tension with the arms 52 and the legs 54 urging outwardly to ensure that the outwardly turned feet 58 extend beyond the diameter of the second clip hole 36 to engage the upper surface of the retaining plate 30 to inhibit the clip 50 from being pushed or pulled through the second clip hole 36.

Figure 7:
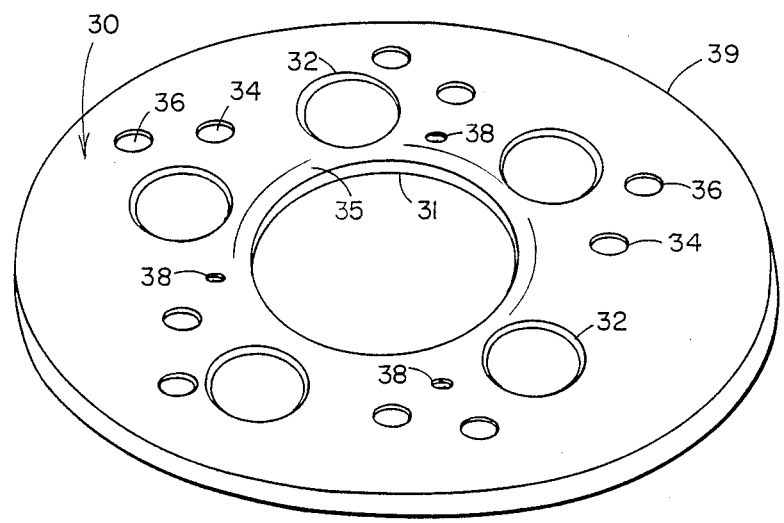
FIG. 7 is a perspective view of the retaining plate of the lug nut retainer of FIG. 1.

Refer now to FIG. 7, there being shown a perspective view of the retaining plate 30. The inner rim portion 35 of the retaining plate 30 is contoured to be curved down to some extent to contact the top surface of the hub plate 14 near the inner edge 31 of the retaining plate 30. The contact of the inner rim portion 35 against the hub plate 14, along with the contact of the retaining plate 30 at the raised holes 15, separates the retaining plate 30 from the upper surface of the hub plate 14 to provide some freedom of movement of the legs 54 and 46 of the clips 50 and 50. The retaining plate 30 has a set of holes corresponding to each lug nut 20. Each set of holes includes a lug hole 32, a first clip hole 34 and a second clip hole 36. The lug holes 32 are provided for accepting the hub studs as described in more detail above. The first clip holes 34 and the second clip holes 36 are positioned for holding the clips 40 and 50 as described in more detail above.

For a lug nut 20 sized to be useful for typical automotive applications, the following set of approximate preferable dimensions have been found to be useful, however, other dimensions may be used and the invention is not limited to the use of the following dimensions. The diameter of the lug nut 36 is about one and one half inches, and the diameters of the first and second clip holes 34 and 36 are each about three eighths of an inch. The centers of the lug hole 32 and the first clip hole 34 are separated by about one and three quarters inches and the centers of the first clip hole 34 and the second clip hole 36 are separated by about one and one quarter inches. The centers of the holes 32, 34 and 36 lie in an approximate straight line. The flange 24 has an outside diameter of about one and three eighths inches and an inside diameter of about one inch. The sleeve 22 has an outside diameter of about one and one eighth inches and an inside diameter of about fifteen sixteenths of an inch. The height of the sleeve 22 is preferably about one quarter of an inch. The clips 40 and 50 are formed from one thirty-second inch diameter steel rod. The ring 42 has a diameter of about one and one quarter inches. The length of arms 44 is about two and one half inches. The length of legs 46 is about one and one quarter inches. The arch 51 separates the two arms 52 by about one quarter of an inch. The arms 52 are about one and three eighths inches long and, in a relaxed position, diverge at an angle 71 of about ten degrees. The angle 70 of arm bends 53 is about one hundred and twenty degrees. The length of first legs 54 is about one and one eighth inches and the first legs diverge at an angle 72 of about twenty degrees with the clip 50 in a relaxed position. The angles formed by the bends 55 and 57 are each about ninety degrees. The length of the second legs 56 is about five sixteenths of an inch and the length of feet 58 is about three sixteenths of an inch.

Figure 8:
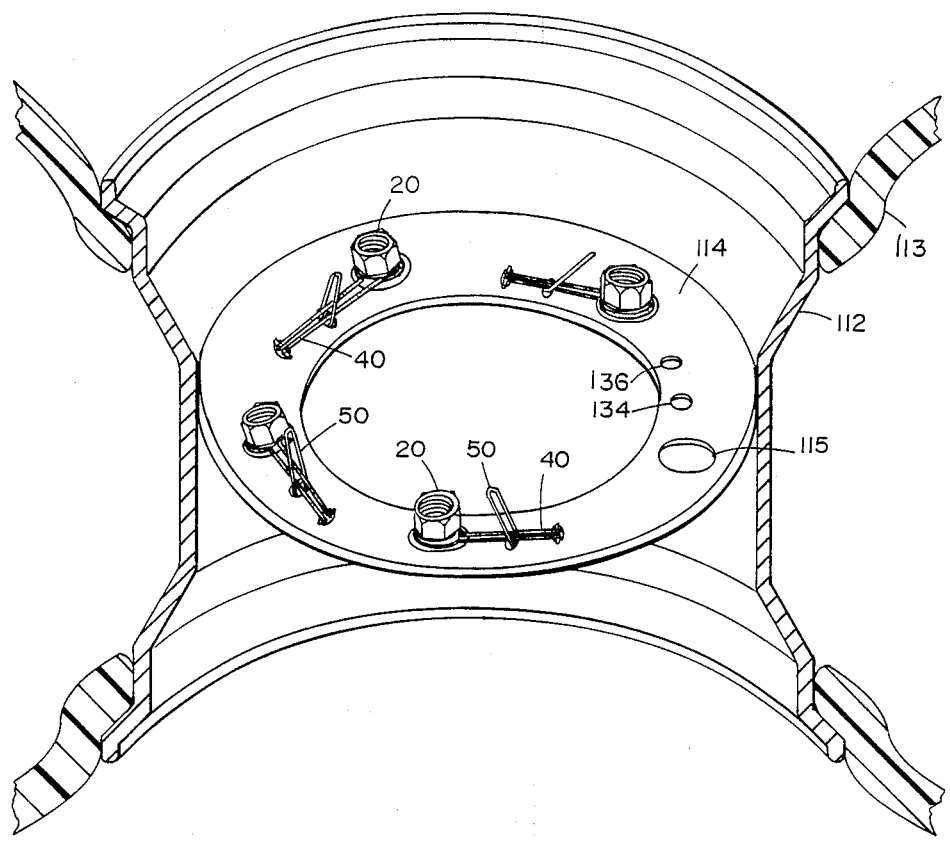
FIG. 8 is a perspective view of a tire wheel including a lug nut retainer according to an alternate preferred embodiment of the present invention.

Refer now to FIG. 8 there being shown a perspective view of a wheel 112 including a lug nut retainer according to an alternate preferred embodiment of the present invention. Tire 113 is mounted onto wheel 112 which includes a hub plate 114. The separation distance between the five hub plate lug holes 115 is greater than the corresponding separation distance between the hub plate holes 15 of the hub plate 14 of the wheel 12 described above with respect to FIG. 1. Typically, for wheels having such wide lug spacings as shown in FIG. 8, the corresponding automobile hub does not fit flush against the back of wheel hub plate 114 in the proximately of the first clip holes 134 and the second clip holes 136 located as shown in FIG. 8. Thus, the holes 134 and 136 are formed directly through in hub plate 114 and a separate retaining plate 30 is not required. Otherwise, the positioning and function of the clips 40 and 50 and the construction of the nut 20 is the same as described above with respect to FIGS. 1 through 7.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed as new and desired to be protected by Letters Patent of the United States is:

1. A lug nut retainer comprising a lug nut having a socket stop means and an outwardly extending flange, retaining means for holding said lug nut in position proximate to a lug hole of a wheel to accept a stud extending through said lug hole and for resiliently urging said lug nut onto said stud and simultaneously allowing said lug nut to rotate to screw onto and off of said stud, said retaining means including a resilient retaining clip affixed to the wheel, said retaining clip being positioned to engage the nut so that the nut will displace said retaining clip upon movement of the nut away from the lug hole, said retaining clip having a thickness, the socket stop means protecting said retaining means, said stop means having a dimension sufficient to protect all of said retaining means from significant rubbing by a tool used to turn said nut.

2. A retainer as in claim 1, wherein said dimension of said stop means is greater than said thickness of said retainer proximate said stop means.

3. A retainer as in claim 2 wherein said retainer engages said nut by extending around said nut.

4. A retainer as in claim 3 wherein said nut has a number of socket faces and the engaging portion of the retainer is at least large enough to extend around said nut at said socket faces.

5. A retainer as in claim 3 when said dimension of said stop means is in the direction of movement of said nut onto and off of said lug nut.

6. A retainer as in claim 1 wherein the nut includes an outwardly extending flange and said retaining clip extends over said flange.

7. A retainer as in claim 6 wherein said retaining clip includes a retaining ring sized to extend around the nut and extend over said flange.

8. A retainer as in claim 7, wherein the nut has a body with a bore extending entirely through said body, said bore being threaded over at least a portion of its length, the nut having a socket end at one end of said bore, a hub end at the other end of said bore and a plurality of socket faces, each of said faces having a hub end and a socket end and each of said faces extending from said socket end of the nut towards said hub end of said nut and arranged on the outside of said body to accept a socket drive tool, said flange extending outwardly from said nut body at a position between the hub end of said faces and the hub end of said nut.

9. A retainer as in claim 8 wherein the nut includes said socket stop extending from the body of the nut at a position between the hub end of said faces and said flange, said socket stop extending outward further than said faces.

10. A retainer as in claim 9 wherein said retaining ring extends around said socket stop.

11. A retainer as in claim 10 wherein said retaining ring has a thickness and said socket stop has a height greater than said retaining ring thickness.

12. A retainer as in claim 11 wherein said retaining means includes limit means for limiting the resilient movement of said retaining clip.

13. A retainer as in claim 7 wherein said retainer clip includes at least one arm extending from said retaining ring to the wheel, said arm being affixed to the wheel.

14. A retainer as in claim 13 wherein said at least one arm is affixed to the wheel by engagement of the retainer clip with holes formed through the wheel.

15. A retainer as in claim 14 wherein said retaining clip includes at least one leg extending from said at least one arm and at least one foot extending from said at least one leg, said wheel includes a first clip hole and a second clip hole formed through its thickness, said at least one arm extends down through said second first clip hole in said wheel, said at least one leg extending under said wheel and said at least one foot extending up through said first clip hole.

16. A retainer as in claim 15 wherein said retaining clip is formed from a single length of rod and there are two each of said arms, of said legs and of said feet.

17. A retainer as in claim 16 wherein said retaining ring is open between its connections with said arms.

18. A retainer as in claim 17 wherein said retaining means includes limit means for limiting the resilient movement of said retaining clip, said limit means including a limit clip having an arch and a pair of arms extending from the arch and attached to said wheel, said retaining clip arms extending between said limit clip arms, and said limit clip arms having a length chosen such that said retaining clip arms will contact said arch before said retaining clip arms are plastically deformed.

19. A retainer as in claim 13 including a retaining plate mounted over the wheel and wherein said at least one arm is affixed to the wheel by engagement of the retaining clip with holes formed through the retaining plate.

20. A retainer as in claim 18 wherein said limit clip includes a first leg extending from each of said arms and a second leg extending from each of said first legs and a foot extending from each of said second legs, said arms extending down through said first clip hole, said second legs extending up through said second clip hole and said feet extending outward to engage the top surface of said wheel.

21. A lug nut retainer comprising a lug nut and retaining means for holding the lug nut in position proximate to a lug hole of a wheel to accept a stud extended through said lug hole and for resiliently urging said lug nut onto said stud and simultaneously allowing said lug nut to rotate to screw onto and off of said stud, said retaining means including a resilient retaining clip affixed to the wheel, said retaining clip being positioned to extended over the nut so that the nut will contact said retaining clip upon movement of the nut away from the lug hole, the nut including an outwardly extending flange and said retaining clip extending over said flange, said retaining clip including a retaining ring sized to extend around the nut and extend over said flange, the nut having a body with a bore extending entirely through said body, said bore being threaded over at least a portion of its length, the nut having a socket end at one end of said bore, a hub end at the other end of said bore and a plurality of socket faces, each of said faces having a hub end and a socket end and each of said faces extending from said socket end of the nut towards said hub end of said nut and arranged on the outside of said body to accept a socket drive tool, said flange extending from said nut body at a position between the hub end of said faces and the hub end of said nut, the nut including a socket stop extending from the body of the nut at a position between the hub end of said faces and said flange, said socket stop extending outward further than said faces, and said retaining ring extending around said socket stop.

22. A lug nut retainer comprising a lug nut and retaining means for holding the lug nut in position proximate to a lug hole of a wheel to accept a stud extended through said lug hole and for resiliently urging said lug nut onto said stud and simultaneously allowing said lug nut to rotate to screw onto and off of said stud, said retaining means including a resilient retaining clip affixed to the wheel, said retaining clip being positioned to extend over the nut so that the nut will contact said retaining clip upon movement of the nut away from the lug hole, the nut including an outwardly extending flange and said retaining clip extending over said flange, said retaining clip including a retaining ring sized to extend around the nut and extend over said flange, said retainer clip including at least one arm extending from said retaining ring to the wheel, said arm being affixed to the wheel by engagement of the retainer clip with holes formed through the wheel.

23. A lug nut retainer comprising a lug nut and retaining means for holding said lug nut in position proximate to a lug hole of a wheel to accept a stud extended through said lug hole and for resiliently urging said lug nut onto said stud and simultaneously allowing said lug nut to rotate to screw onto and off of said stud, said retaining means including a resilient retaining clip affixed to the wheel, said retaining clip being positioned to engage the nut so that the nut will urge said retaining clip upon movement of the nut away from the lug hole, the nut including an outwardly extending flange and said retaining clip extending over said flange, said retaining clip including a retaining ring sized to extend around the nut and extend over said flange the nut having a body with a bore extending entirely through said body, said bore being threaded over at least a portion of its length, the nut having a socket end at one end of said bore, a hub and at the other end of said bore and a plurality of socket faces, each of said faces having a hub end and a socket end and each of said faces extending from said socket end of the nut towards said hub end of said nut and arranged on the outside of said body to accept a socket drive tool, said flange extending outward from said nut body at a position between the hub end of said faces and the hub end of said nut, the nut including a socket stop extending from the body of the nut at a position between the hub end of said faces and said flange, said socket stop extending outward further than said faces.

24. A retainer as in claim 23 wherein said flange extends outwardly further than said faces.

25. A retainer as in claim 24 wherein said flange extends outwardly further than said socket stop.

* * * * *